United States Patent [19]

Michael

[11] Patent Number: 4,862,830
[45] Date of Patent: Sep. 5, 1989

[54] SELF-CLEANING CAT PAN DEVICE

[76] Inventor: Richard D. Michael, 7910 Milbury Rd., Baltimore, Md. 21207

[21] Appl. No.: 145,551

[22] Filed: Jan. 19, 1988

[51] Int. Cl.⁴ .............................................. A01K 67/00
[52] U.S. Cl. ............................................ 119/1; 11/239
[58] Field of Search ................................. 119/1; 4/239

[56] References Cited

U.S. PATENT DOCUMENTS

| | | | |
|---|---|---|---|
| 1,813,329 | 7/1931 | Supplee | 119/1 |
| 2,039,783 | 5/1936 | Edeling | 119/1 |
| 2,053,594 | 9/1936 | Albert | 119/1 |
| 2,584,656 | 2/1952 | Anderson | 119/1 |
| 3,580,219 | 5/1971 | Stebbins | 119/1 |
| 3,601,093 | 8/1971 | Cohen | 119/1 |
| 3,603,290 | 9/1971 | O'Rork | 119/1 |
| 3,656,457 | 4/1972 | Houston | 119/1 |
| 3,793,988 | 2/1974 | Traeger | 119/1 |
| 3,921,582 | 11/1975 | Sedlmeir | 119/1 |
| 4,117,555 | 10/1978 | Dennis | 119/1 |
| 4,181,096 | 1/1980 | Grubman | 119/1 |
| 4,228,554 | 10/1980 | Tumminaro | 119/1 |
| 4,231,321 | 11/1980 | Cohen | 119/1 |
| 4,262,634 | 4/1981 | Piccone | 119/1 |
| 4,593,645 | 6/1986 | Dingler | 119/1 |

Primary Examiner—Robert Peshock
Assistant Examiner—R. Thomas Price

[57] ABSTRACT

A modified cat litter pan utilizing a pair of adjustable brackets that support the device on the rim of a commode bowl at a sufficiently acute angle to allow the device's contents to be discharged through a front hinged gate when forced out by a sliding brush contained within. After discharge the discarded material can be then flushed down the existing drain.

1 Claim, 4 Drawing Sheets

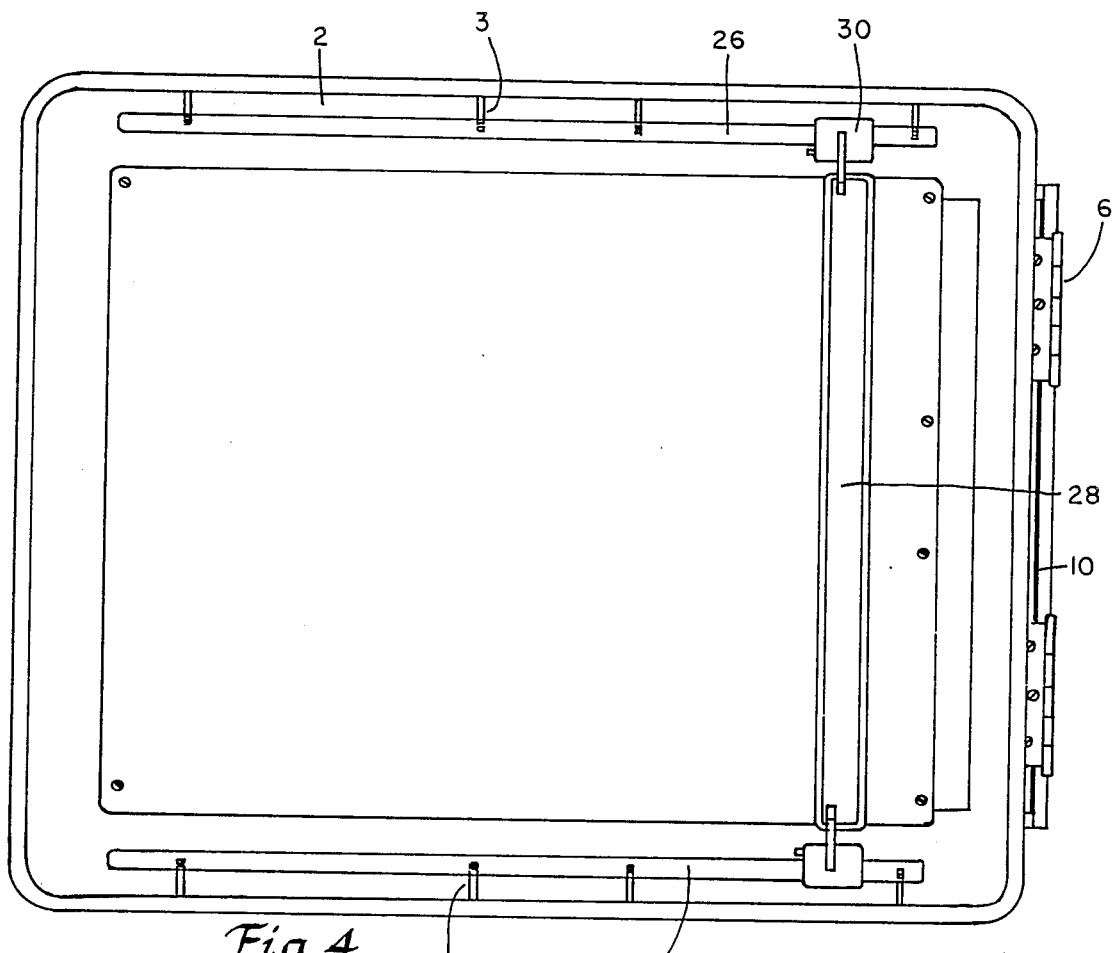
Fig. 4
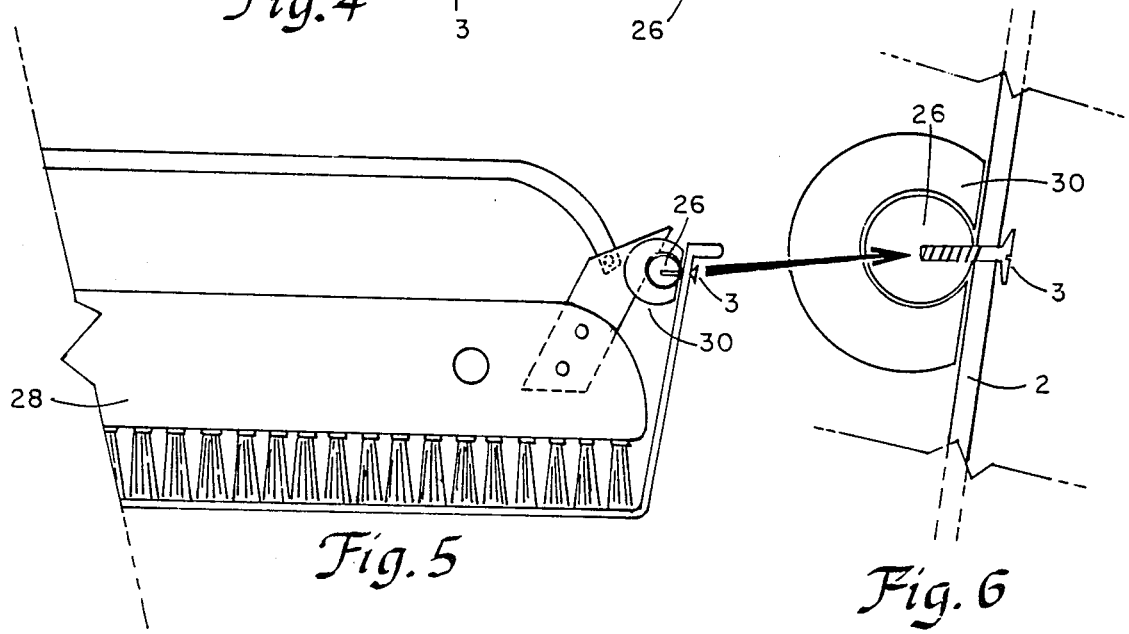
Fig. 5
Fig. 6

SELF-CLEANING CAT PAN DEVICE

BACKGROUND OF THE INVENTION

This invention relates to a cat litter device that addresses the difficulties of disposal of used cat litter, making it possible to easily discard the used filler at much more frequent intervals to most effectively control the unpleasant odors associated with feline waste.

Various forms of feline waste collection and disposal devices have been utilized by cat owners in the past, with all being essentially the same in appearance and function. Typically, these containers capitalize on the natural instinct of cats to deposit their wastes in a granular medium that they can dig into, and then cover over. The variety of materials used as filler are chosen for their ability to absorb liquids and dry solids, thereby controlling odors somewhat until the pet owner has the opportunity to discard all or part of the contents. The level of odor control is determined by the degree of dessication afforded by the particular choice of filler medium, and the frequency of disposal. Because of the considerable labor required to totally change the litter, most cat owners tend to sift the solids and super saturated litter by hand daily, and then completely replace the contents at least once a week (more often depending on the number of animals sharing the litter pan).

Because this entire process is tedious, and requires much physical contact with the animal wastes, attempts have been made in the past to deal with animal excretions more easily. Most previous devices have proven large and complex by design, expensive and impractical in a home environment.

Examples of prior art describe various apparatus intended to limit the labor and physical contact with the waste products. These devices are generally of two types. The first, as disclosed in Wheeler U.S. Pat. No. 4,027,625, receives the soiled litter in an airtight compartment. When the compartment is full the contents are manually emptied.

Cotter U.S. Pat. No. 4,096,827 discloses another storage type device of a portable variety that also requires the pet owner to dispose of soiled litter that has been allowed to collect over a period of time.

The second type are those that literally flush like a commode, as disclosed in Kramer U.S. Pat. No. 2,204,416.

Knochtel et al. U.S. Pat. No. 4,050,414
Walker U.S. Pat. No. 4,242,763
Dingler U.S. Pat. No. 4,593,645
Dennis U.S. Pat. No. 4,117,555
all disclose similar devices that require permanent connection to a clean water supply and a sewer system via a drain.

Piccone U.S. Pat. No. 4,262,634 discloses a device that is permanently mounted on an existing commode's bowl.

None of the prior inventions utilizes the unique aspects that the herein described device addresses.

SUMMARY OF THE INVENTION

The purpose of the present invention is to provide the pet owner with a litter collection and disposal device that limits the physical contact required in the disposal of the animal waste.

Another object of the present invention is to most effectively limit the offensive odors associated with animal excrement by greatly simplifying the labor required to perform this chore of pet ownership, and thereby allow the cat owner to more frequently dispose of the source of the offending odors.

It is yet another object of the present invention to accomplish the aforementioned tasks by use of a simple and inexpensive mechanism that requires no expensive plumbing connections or complicated hardware.

The basic structure of this invention consists of a containment tray that can be mounted with a removable hood. The tray itself rests on a pair of brackets that may be adjusted along the width with respect to the bottom of the tray. Each of the brackets has a cutout forward portion adapted to facilitate mounting of the device on the edge of a commode bowl (after the seat is raised). The cutout is so formed to enable the device to be mounted on the rim and to be inclined downwardly at an angle relative to the commode bowl.

The front wall of the tray has an opening formed therein, and the opening is covered by a hinged gate. The gate is closed against an extension piece mounted on the front wall of the tray, and projecting forwardly therefrom. The gate is retained by means of a magnetic latch (or its equivalent). A gasket between the gate and the extension piece assures a proper seal.

The interior side walls of the tray are provided with rails or tracks, and these tracks receive respective bearings. Each bearing has a cut out portion that is fitted over its respective rail. The bearings are connected to a brush. The brush is thus slidably movable lengthwise on the tray.

With this structure, when the device is mounted on the commode bowl, and the gate is lifted to expose the opening in the end wall of the tray, the brush is moved forwardly along the rails so as to brush out all of the contents of the litter into the commode bowl where it is flushed down the drain.

After discharge, the gate is closed, the device is lifted off the commode bowl, the brush is returned to the rear, and fresh flushable litter is installed in the tray, making it possible to repeat the procedure.

In the preferred embodiment of the invention, the cat pan, which is most often already located in the pet owner's bathroom, is conveniently located to facilitate the unique method of operation of this device.

All objects of this invention will become apparent from the accompanying drawings and detailed description of the preferred embodiment that follows.

BRIEF DESCRIPTION OF THE DRAWINGS

FIG. 4 is a top view of Cat Pan Device with sliding brush in forward position;

FIG. 5 is a sectional view showing the sliding brush mechanism;

FIG. 6 is an enlarged sectional view detailing sliding brush bearing and rail retention.

DESCRIPTION OF THE PREFERRED EMBODIMENT

The illustrated preferred embodiment is not intended to be limiting to the precise form disclosed. What is shown is chosen to best describe and explain the basic principles of the invention and its application and practical use.

Figure 1:
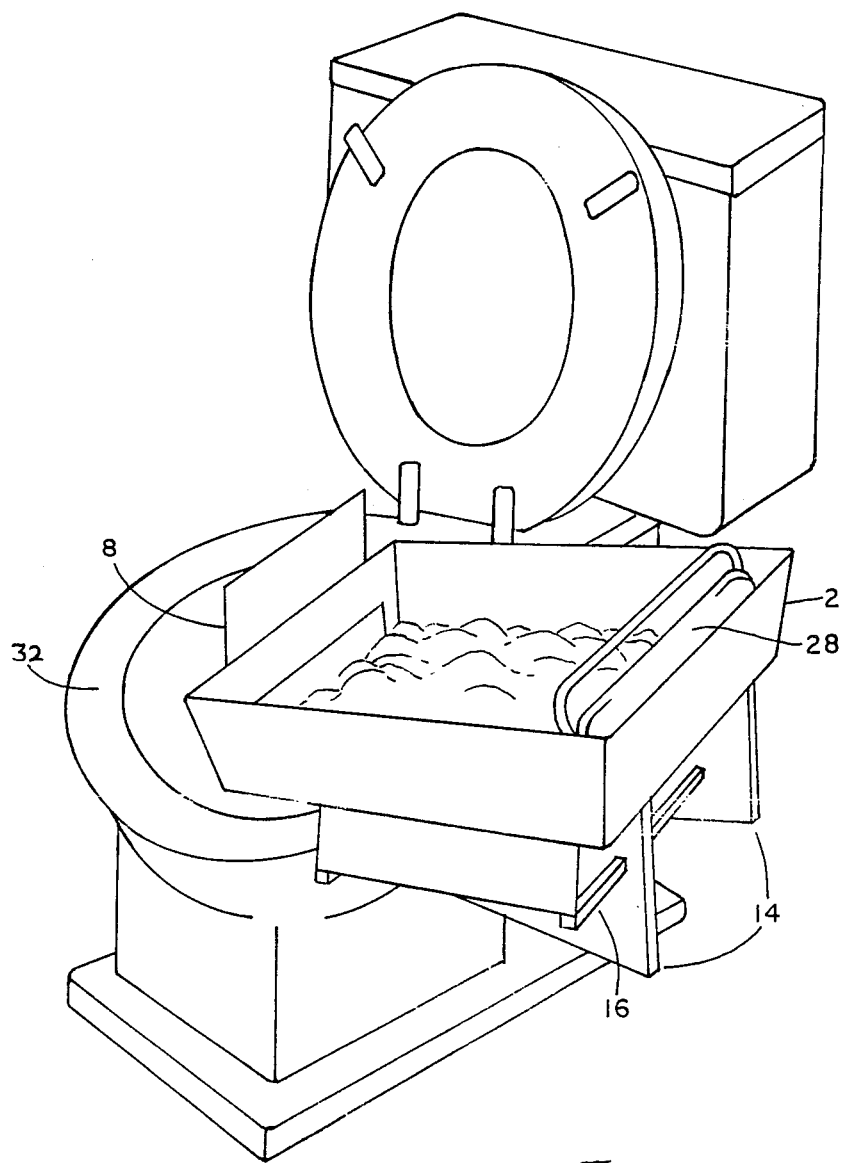
FIG. 1 is a pictorial view of the Cat Pan Device shown mounted on commode rim and ready for emptying.

Referring to the drawings, and more particularly to FIG. 1 thereof, there is shown the Cat Pan Device containing litter 7 mounted on commode rim with the gate 8 open and ready for discharge.

Figure 2:
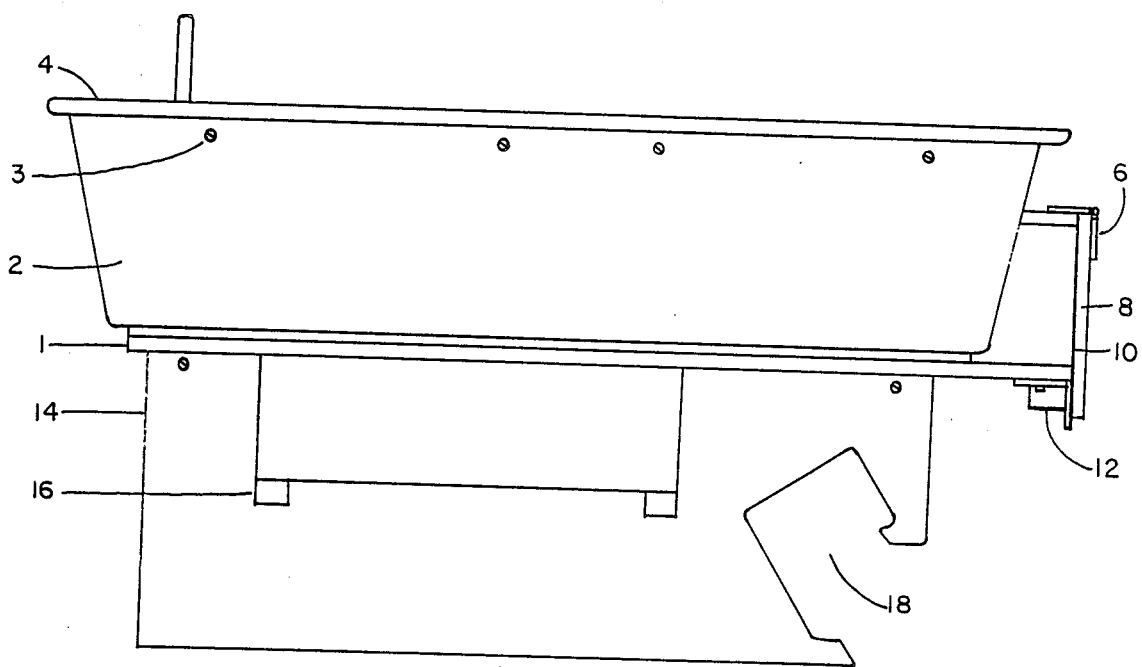
FIG. 2 is a side view of Cat Pan Device.
Figure 3:
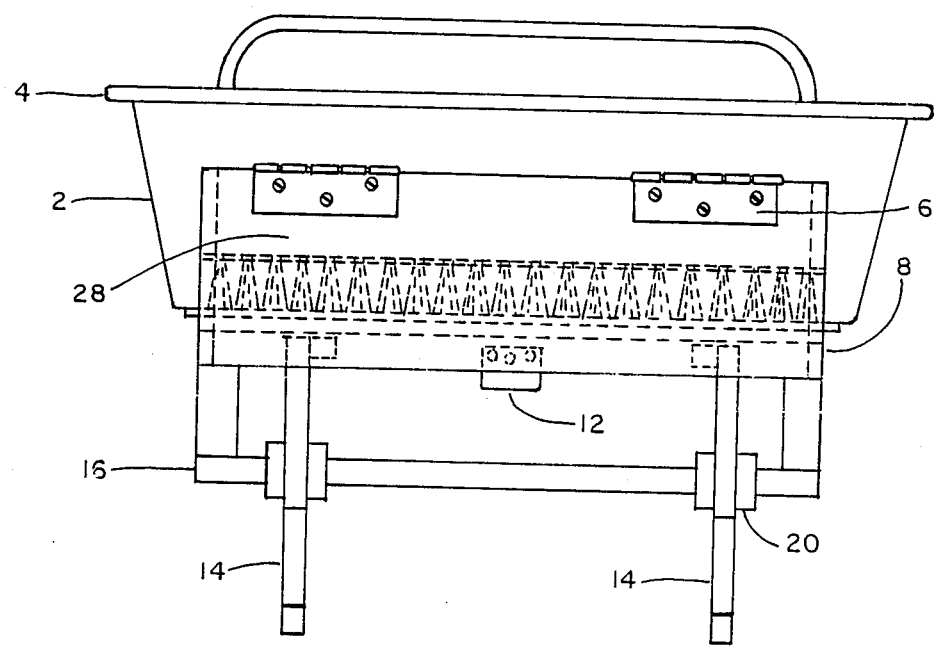
FIG. 3 is a front view of Cat Pan Device.
Figure 7:
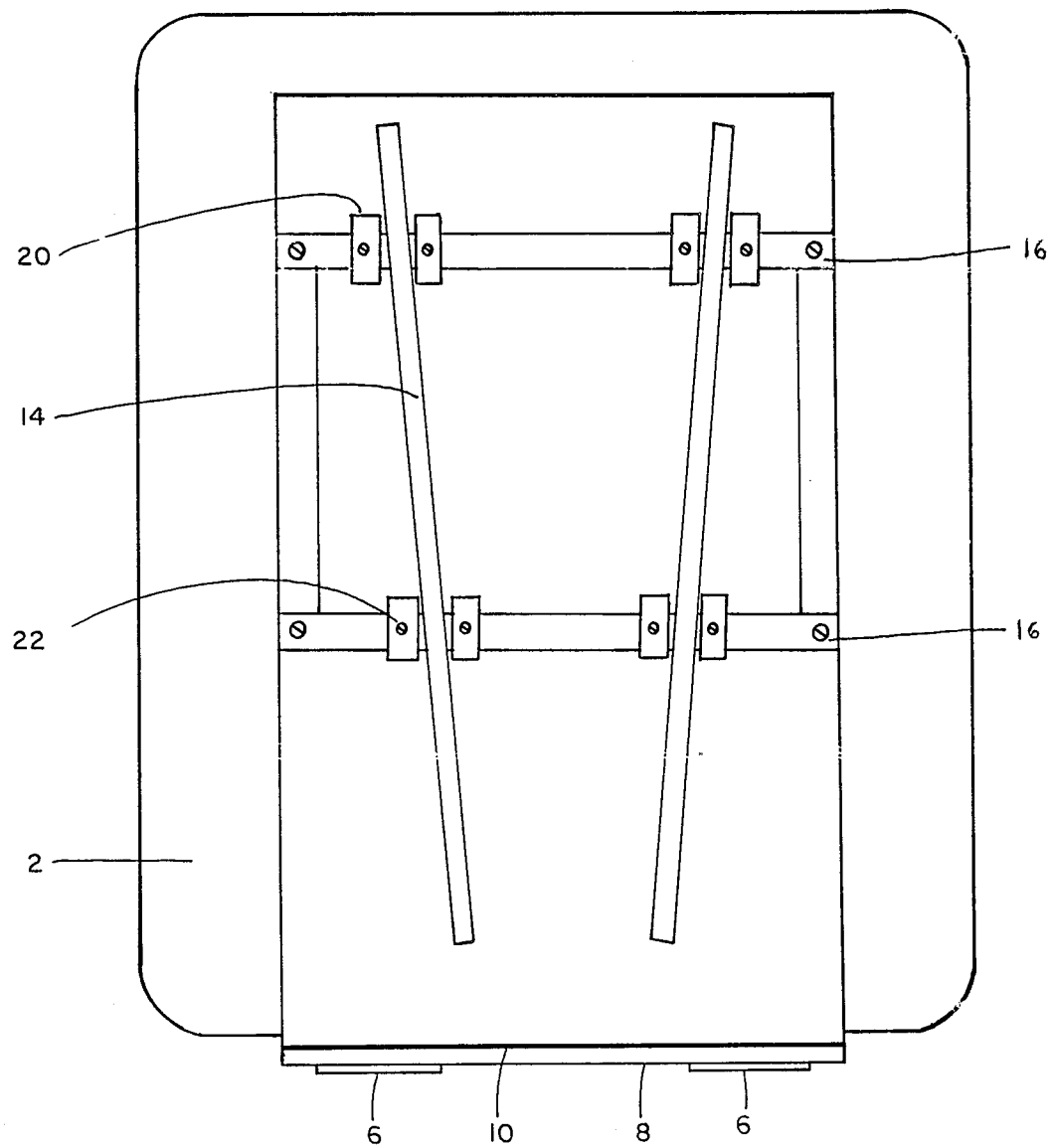
FIG. 7 is a bottom view showing commode rim bracket adjustability.

Referring now to FIGS. 2, 3 and 7 the device includes a containment tray 2 supported by two commode brackets 14 which are adjustable along the width of the tray 2 by means of two bracket rails 16 and held securely in place by means of eight bracket retainers and eight bracket retainer set screws 22. The forward portion of the commode brackets 14 have a cutout portion 18 allowing the device to be hooked on the commode rim 32 with the forward wall of the unit centered over the commode bowl. The front wall of the tray 2 has an opening formed therein, and the opening is covered by a gate 8. Between the gate 8 and the opening is a gasket 10 that assures a proper seal. The gate is able to open and close by means of hinges 6 that join the gate to the tray 2, and is secured by means of a latch 12.

Referring now to FIGS. 4, 5 and 6, the interior of the tray contains a brush that is mounted on two bearings 30, one on each end, that allow it to run up and down the length of the tray along and guided by two brush rails 26 opposite each other secured to, and running lengthwise along the interior side walls of the tray and attached by rail retainer screws 3 that enter through the tray and into the brush rails 26.

Referring now to FIG. 7, the commode brackets which are adjustable along the commode bracket rails 16 to accomodate the particular commode in use are secured in place by the bracket retainers 20 and set screws 22.

In operation the Cat Pan Device is ready to accept animal wastes when the gate 8 is closed, the discharge brush 28 is slid rearward, and the containment tray 2 is filled with a sufficient volume of flushable litter 7.

As necessary, the entire device is lifted up and engaged to the commode rim 32 within the cutout portions 18 of the commode brackets 14. With the device mounted, the gate is opened, exposing the soiled litter 7, and the discharge brush 28 is slid forward expelling the contents of the containment tray into the commode bowl where it can be flushed down the drain.

With the contents emptied, the discharge brush 28 is returned rearward to its storage position and the gate 8 is closed and secured with the latch 12.

After the process of emptying is complete, the device is lifted off of the commode rim 32 and set back on the ground. Then the containment tray 2 is refilled with suitable litter 7 and the device is ready for use again.

It is to be understood that while the invention has been described and illustrated in detail in the drawings and preceding description, it is only the preferred embodiment that has been shown and described, and that all changes and modifications that come within the spirit of the invention are desired to be protected.

What is claimed is:

1. An animal waste collection and disposal device containing litter media into which animal wastes are deposited and contained, the device comprising:
   a leakproof containment vessel with walls extending upwardly from a bottom portion, and an open top:
   said containment vessel having a normally closed orifice located in one of said upwardly extending walls through which used litter can be discharged, said orifice openable by means of a movable closure:
   a self-contained wiping means for directly advancing used litter from within the containment vessel towards said orifice;
   said wiping means includes a discharge member guided by and attached to rails that are oppositely positioned, and secured to and extend lengthwise along interior walls of said containment vessel to physically move used litter towards the orifice;
   an attachment means connected to the containment vessel that provides for the device to be engaged temporarily to a side portion of a commode bowl at a sufficient angle to allow discharge of used litter into said commode bowl;
   and a means for expanding and contracting said attachment means, making the device compatible with various shapes and sizes of commode bowls.

* * * * *